Patented Aug. 13, 1940

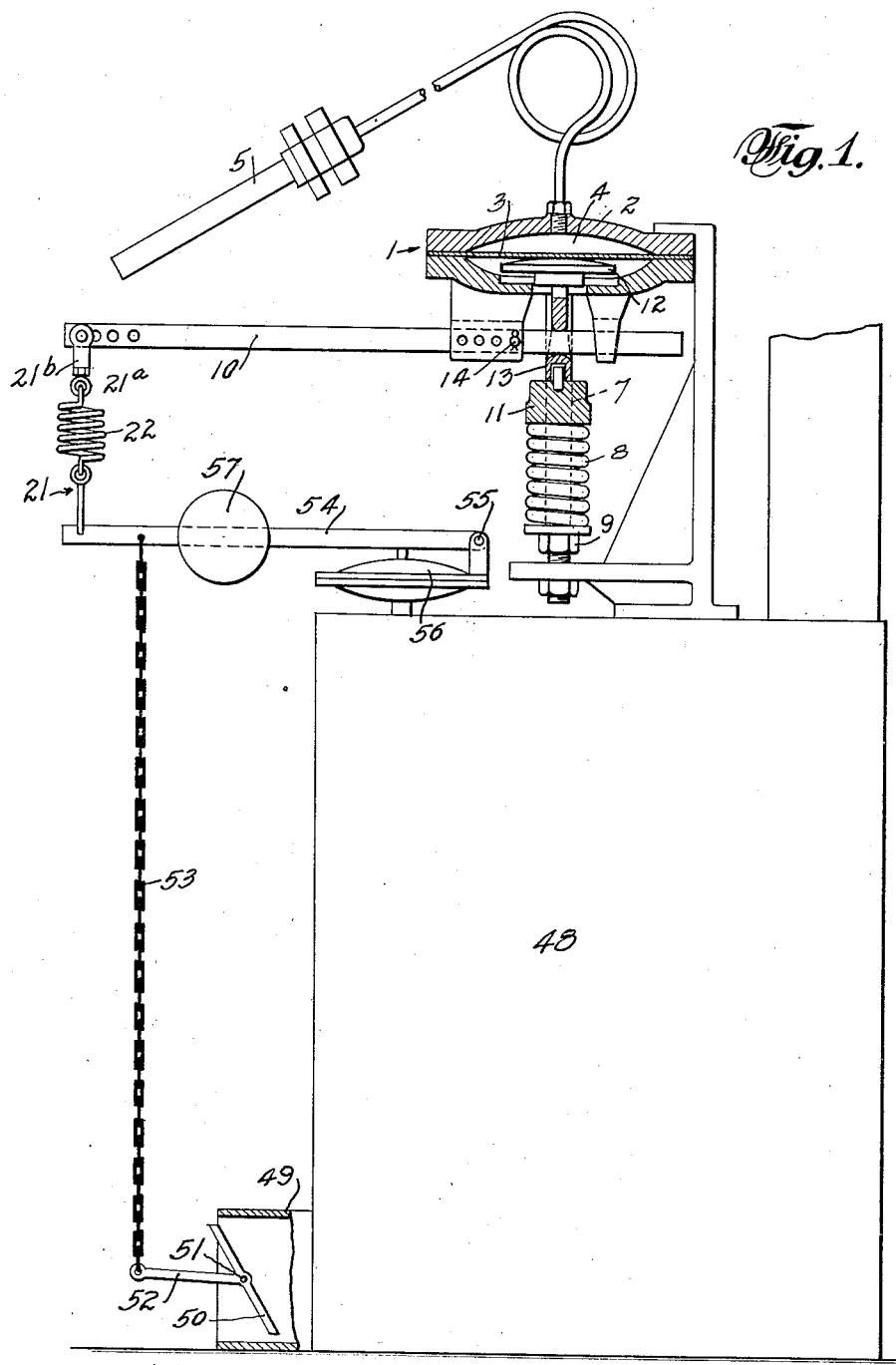

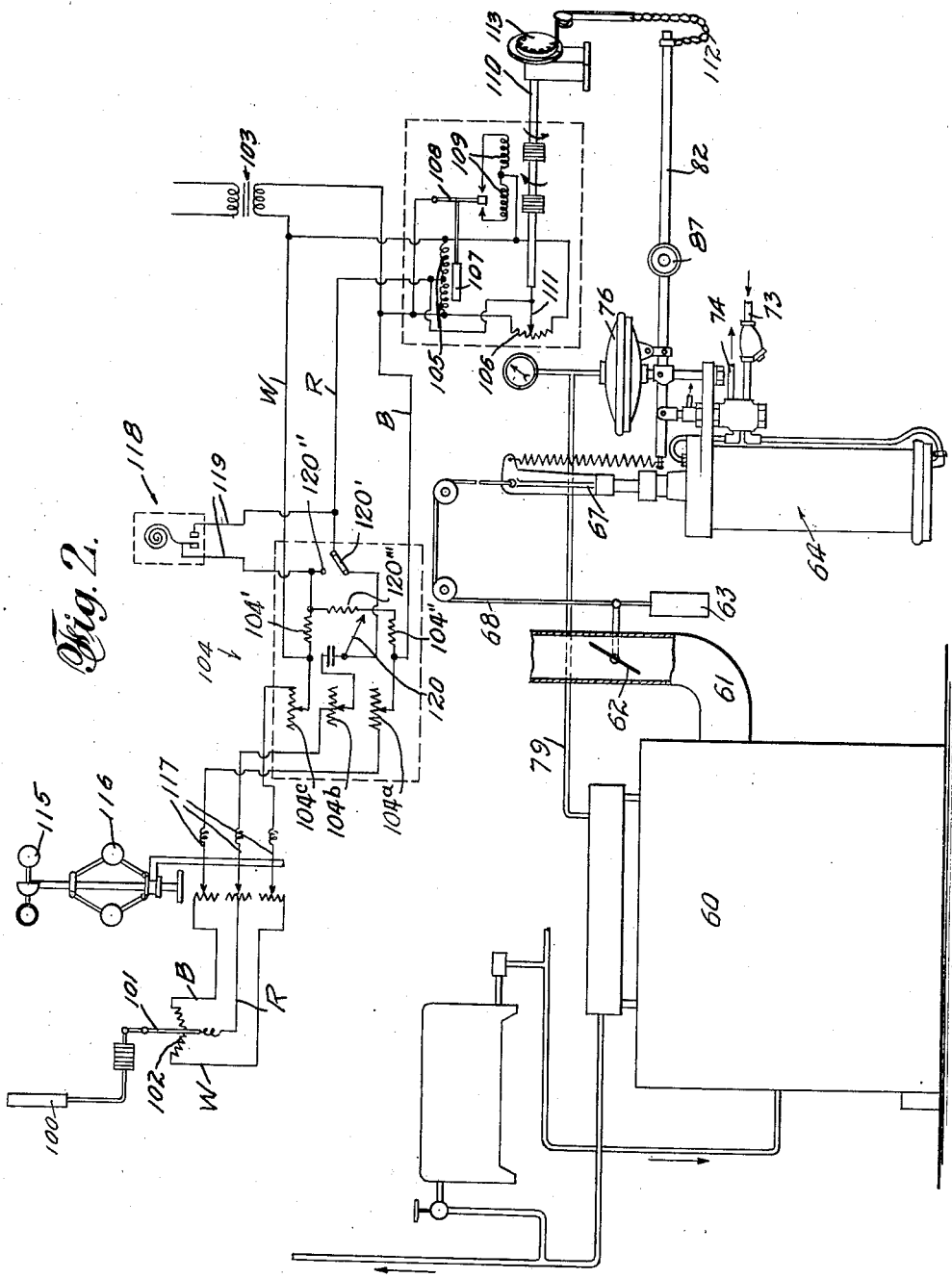

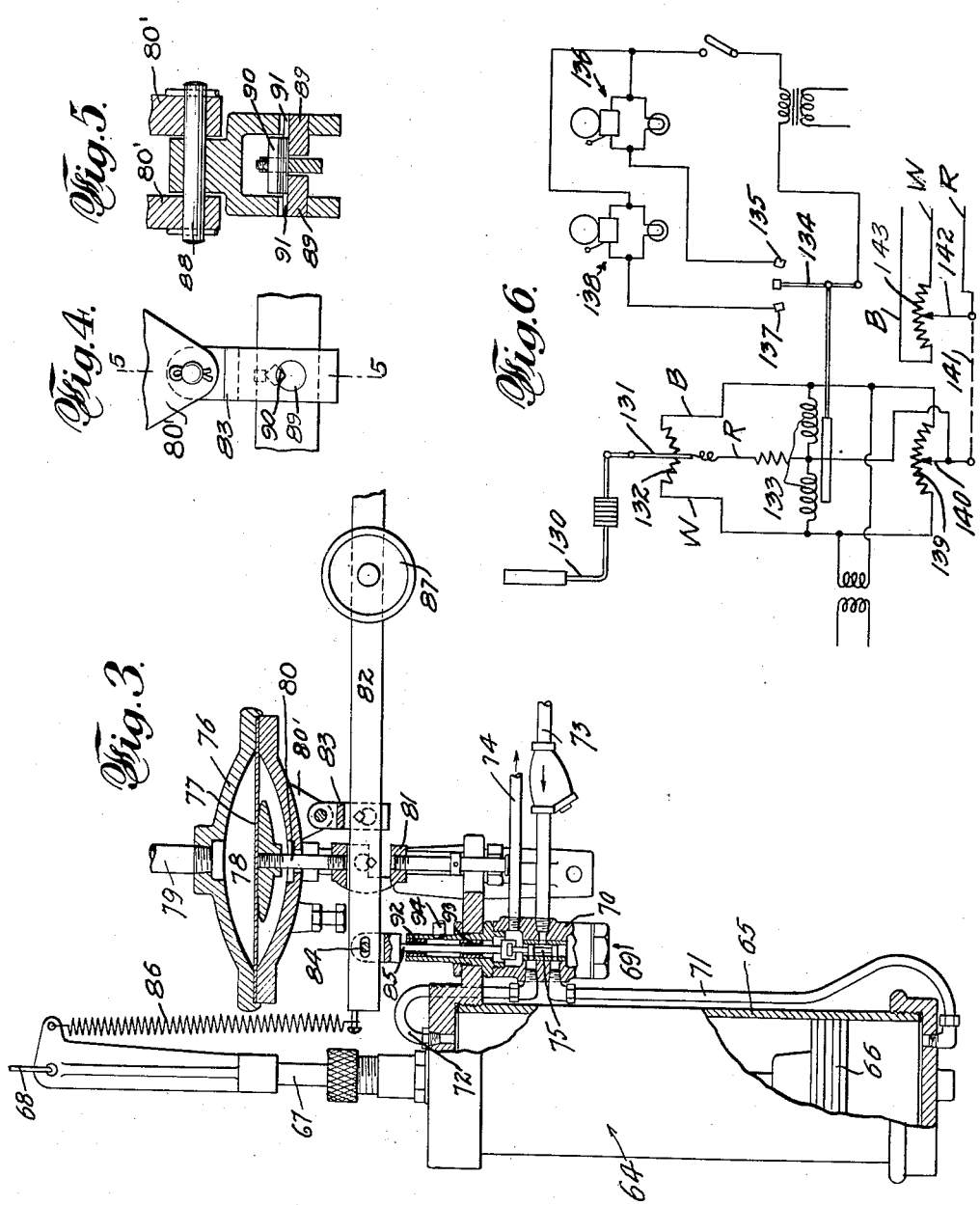

2,211,300

UNITED STATES PATENT OFFICE 2,211,300

DAMPER REGULATOR

Paulsen Spence, East Orange, N. J., assignor to Spence Engineering Company, Inc., Walden, N. Y., a corporation of New York Application May 12, 1936, Serial No. 79,327

2 Claims. (Cl. 236—85)

My invention relates to a damper regulator or the like, and this application is a continuation in part of my co-pending application, Serial No. 538,430, filed May 19, 1931, now Patent No. 2,040,109 of May 12, 1936.

It is the general object of my invention to provide an improved damper regulator, or the like, embodying an improved thermostatic or other control.

It is another object to provide a damper regulator embodying a loading means for normally urging the damper toward one extreme of its movement and means controlled thermostatically or otherwise for varying the effective loading of said loading means.

It is another object to provide novel and improved features in a damper regulator, with a view to greater accuracy in operation and simplicity of construction.

Other objects and various features of invention will be hereinafter pointed out or will become apparent to those skilled in the art.

In the drawings which show, for illustrative purposes only, preferred forms of the invention—

Fig. 1 is a view partly in elevation and partly in section of a boiler and damper regulator, illustrating features of the invention;

Fig. 2 is a view of a boiler and damper regulator of a modified form and automatically controlled in accordance with variations in temperature and wind velocity.

Fig. 3 is an enlarged sectional view of the damper regulator shown in Fig. 2;

Fig. 4 is an enlarged fragmentary view of a pivot means shown in Fig. 3;

Fig. 5 is a sectional view taken substantially in the plane of the line 5—5 of Fig. 4; and Fig. 6 is a fragmentary diagrammatic view similar to Fig. 2 but illustrating a modification in which the damper regulator loading variation is manual but in accordance with automatically indicated temperature at a selected point.

My improved damper regulator includes means for varying the loading of the means regulating or actuating the damper. In that form of the invention illustrated in Fig. 1 and as to which form this application is a division of my aforesaid co-pending application, 1 represents generally a thermostat. In the form shown in the drawings the thermostat is a pneumatic thermostat having a body 2, a flexible diaphragm 3 and a diaphragm chamber 4. A thermostat bulb 5 is connected by means of a pipe shown to the diaphragm chamber 4. The parts 4, 5 and 6 together form a closed chamber in which is confined a quantity of vapor tension element which expands as its temperature increases. The thermostat bulb 5 will ordinarily be placed where it is exposed to the temperature of the outside air, but it may be placed in any other location, the temperature at which is to control the valve. Attached to the body 2 are one or more spring rods 7—7, which are surrounded by spiral springs 8—8, which are supported by adjusting nuts 9—9, which are threaded on the rods 7—7. A lever 10, is operated in one direction by the pressure on the diaphragm 3 and in the opposite direction by the springs 8—8. Supported by the springs 8—8 is a spring yoke 11, and coacting with the diaphragm 3 is a disk 12. A lever yoke 13 is held between the spring yoke 11 and the disk 12 and has an opening therein through which the lever 10 passes. The lever 10 is pivoted to the body 2 in any convenient manner as by a pin 14 which passes through holes in the body 2 and in the lever 10. A number of these holes are provided to adjust the leverage. The body 2 provides a positive stop for the diaphragm 3. The springs 8—8 may therefore be placed under an initial tension by means of the adjusting nuts 9—9. The thermostat 1 controls the loading of a fluid pressure actuated means which is in turn connected to and actuates the damper.

In Fig. 1, 48 represents a steam boiler which is equipped with a valve or damper for regulating the flow of air to the furnace or the flow of gases from the furnace to the chimney. In the form shown 49 represents the body of such a valve or damper and 50 represents the valve head or damper proper. The valve as shown is positioned so as to regulate the flow of air to the furnace. The valve head 50 is pivoted at 51. Fixedly attached to the valve head 50 is a weighted arm 52 which normally tends to hold the valve open. 53 is a connection between the arm 52 and a lever 54 which is pivoted at 55. The lever 54 is actuated in a direction to close the valve by a fluid pressure operated actuator 56 which is operated by steam from the boiler 48. 57 is a weight which is adjustable longitudinally of the arm 54. 21 is a connection which connects the thermostat to the lever 54.

It will be seen that as the temperature to which the thermostat bulb 5 is exposed is increased, the left hand end of the lever 10 will be moved upward, thereby exerting a force on the lever 54 which will tend to close the valve.

The operation of the device is as follows:

Let us suppose that it is desired to maintain a steam pressure in the boiler 48 of 10 lbs. per square inch when the temperature of the outside air is 0° F. and that it is desired to maintain a pressure of 3 lbs. per square inch when the temperature of the outside air is 50° F. The setting of the weight 57 will be adjusted so as to permit the valve to close when the pressure in the boiler reaches a pressure of 10 lbs. per square inch. The tension of the thermostat springs 3—8 will be adjusted so as to maintain a pressure of 3 lbs. per square inch at 50° F. The length of the connection 21 will be adjusted so that there will be no force transmitted by the connection when the air temperature is 0° F. With this arrangement it is apparent that when the temperature of the outside air is 0° F. the weight 57 will move the lever 54 downward against the pressure exerted by the pressure actuated means 56, so as to permit the valve to open widely until the pressure in the boiler reaches 10 lbs. per square inch. On the other hand, when the temperature of the air is greater than 0° F. the thermostat which is connected to the connection 21 will exert an upward pull on the lever 54, thereby permitting the valve to be closed by a lesser pressure in the pressure actuated means 56. When the temperature of the air reaches 50° F. the upward pull of the thermostat on the arm 54 will offset the effect of the weight 57 to such an extent that a pressure of 3 lbs. per square inch in the pressure actuated means 56 will be sufficient to close the valve.

In the form shown in general in Figs. 2 and 3 the damper is actuated or controlled directly in its movements by a motor, which may be operated by any suitable source of pressure fluid, such as city water. The motor is under control of a pressure actuated means connected, for example, to the steam space of the boiler and is loaded to maintain some definite pressure while temperature and other conditions remain the same. I provide means for automatically varying the loading on the pressure actuated means in accordance with a control condition, as the temperature at a control point, for instance at the outside of a building, and also, if desired, in accordance with wind velocity.

In Fig. 2 60 indicates a boiler having a stack 61 and a damper 62. The damper may be urged toward closed position, as by means of a weight 63, as will be understood. The position of the damper 62 is controlled by what may be termed the damper regulator proper or motor 64. The motor shown comprises a cylinder 65 having a piston 66 movable therein. The piston rod 67 projects through a stuffing box in one of the cylinder heads and is attached by means of a flexible connection 68 to an arm on the damper 62, so that when the piston 66 is moved upwardly the damper will close and, conversely, when the piston 66 is moved downwardly in the cylinder, the damper 62 will open.

The motor 64 is controlled by a pilot valve 69, which comprises a valve casing 70 having pressure connections 71—72 to opposite ends of the cylinder 65. A fluid pressure inlet pipe 73 opens into the casing 70 at a point between the inlet openings of the connections 71—72 and a waste or discharge outlet pipe 74, is connected to the casing and communicates with the various passages. The passages are controlled by a spool valve 75. Thus, when the spool valve 75 is lowered slightly from the position shown in Fig. 3, pressure fluid such as city water in the pipe 73 may pass through the pipe 71 to the space beneath the piston 66 for raising the same. At the same time fluid above the piston may pass out the pipe 72 and into the waste pipe 74. On the other hand, when the spool valve is raised from the position shown in Fig. 3, pressure fluid from pipe 73 may pass through the spool valve and through the pipe 72 to the cylinder above the piston, while at the same time fluid below the piston 66 may discharge through pipe 71 and into the space below the spool valve and through a passage (not shown) into the waste pipe 74. Thus, by movement of the spool valve 75 either up or down, the actuation of the piston 66 is effected.

The position of the spool valve is controlled by several factors, including the steam pressure. As illustrated, a fluid pressure means, such as a diaphragm casing 76, is mounted on a bracket on the motor 64. Fluid pressure actuated means may include a diaphragm 77 in the casing and from the diaphragm chamber 78 a pressure connection 79 leads in this instance to the steam space of the boiler 60 so that boiler pressure is always on the upper side of the diaphragm. Either connected to the diaphragm or urged into engagement therewith is a stem 80 which, at the lower end, is connected to a yoke 81 carrying one part of a pivotal connection, while a lever 82 embraced by the yoke carries the other part of a pivotal connection. The lever 82 is hung in a swinging bifurcated bracket 83 from the casing 76 and the lever 82 is pivoted in the swinging bracket 83 by improved means which will be later described. The lever to the left of the pivots is pivotally connected as by means of a pin and slot connection 84 to the piston rod 85 of the spool valve 75, so that as the lever 82 oscillates, for example under the influence of the steam pressure in the diaphragm chamber 78, the spool valve will be moved up or down so as to effect movement of the piston 66 and consequent changing of the damper setting. A spring 86 connects the piston rod 67 to the left hand end of the lever 82, so that as the piston 66 moves upwardly, tending to close the damper, the spring 86 is tensioned, thus urging the lever 82 about its pivotal connection 83 and tending to raise the spool valve 75 and shift the valve 75, so as to tend to close the damper. Thus very close regulation of the damper position may be maintained. An adjustable counterweight 87 is secured on the lever 82 to the right of the pivotal connections so that any desired base steam pressure may be maintained by a proper setting of the weight 87, that is to say, when a higher steam pressure is desired the weight 87 is moved farther out on the lever 82 and when a lesser pressure is desired the weight 87 is moved inwardly on the lever 82.

Before describing the further control of the damper by means such as outside temperature, I shall describe improved pivot means for the lever 82 making for relatively frictionless pivotal movement of the lever, with consequent greater accuracy in maintenance of steam pressures. As shown in Figs. 4 and 5, the hanging pivot link 83 is pivoted as by means of a through pin 88 to a pair of ears 80' on the diaphragm casing 76. The link 83 is bifurcated and in each of the arms are mounted pins 89 which pins extend inwardly toward each other and up quite closely to the sides of the lever 82 so as to act as guides for the latter. The lever itself carries a square pin 90 projecting from opposite sides thereof, and one edge of the square pin, which I term a knife edge, rides in V-grooves 91—91 in the inwardly projecting pins 89—89. By the means described, the knife edge pivotal connection is almost frictionless and the slightest unbalancing of the lever 82 serves to move the same with consequent proper regulation of the pressure. Furthermore, the pivotal connection between the lever 81 and the yoke 82 may be of the same form as that shown in Figs. 4 and 5, except that the pin carried by the lever acts upwardly on the V-grooves of the pins carried by the yoke 81, instead of downwardly, as shown in Figs. 4 and 5. Another feature making for extreme ease of oscillation of the lever 82 resides in the elimination of a tight stuffing box on the pilot valve casing 70. In place of the usual stuffing box I provide a relatively loose fitting bushing 92 about the valve stem 85, near the top, and a second relatively loose fitting bushing 93 about the valve stem 85 at a point just above the chamber leading to the discharge pipe 74. In other words, I provide instead of a tight stuffing box a joint which is capable of substantial leakage, thus making for very free sliding movement of the valve stem 85. Any fluid which might otherwise leak out through the upper bushing 92 is discharged through a waste pipe 94 between the two bushings, and since the capacity of the waste pipe 94 is so much greater than the space between the loose fitting bushing 92 and the stem 85, there is no danger of leakage past the bushing 92.

By the means described, it is possible to maintain steam pressures within exceedingly close limits; that is to say, for ordinary low pressure house heating boilers where pressures of only a pound or two are generally maintained, my damper regulator will regulate such steam pressures within limits of an once or less.

I have provided improved means for varying the normal loading on the damper regulator, which means varies such loading in accordance with one or more control factors, such as temperature, at a control point or at the outside of a building, and wind velocity or other factors which can act as control factors for the damper, thus causing a steam pressure to be maintained commensurate with weather conditions. In the form illustrated, I employ a thermostat 100 which actuates a blade 101 contacting with a resistance 102 and constituting what I term a control potentiometer. The blade is connected to a wire R and one side of the resistance 102 is connected to a wire W, while the opposite side is connected to a wire B. These wires are connected to the usual line wires, preferably through a transformer 103, as shown. The wires W, B and R lead through a panel board, designated generally 104, to solenoid coils 105 and a balancing potentiometer coil 106. One or the other of the coils 105 serves to alternately move the core 107, controlling a switch blade 108, which, depending upon its position, makes contact to energize one or the other of the rotary motors 109 driving shaft 110. Thus, energizing one of the motors 109 will serve to rotate the shaft 110 in one direction, while energizing the other will serve to rotate the shaft 110 in the opposite direction. On the shaft 110 is a blade 111 electrically connected to the wire R. Now, suppose the outside temperature rises. The thermostat 100 will move the blade 101 toward the left so as to reduce the resistance in the wire W. Such reduction in resistance in the wire W unbalances the coils 105 and causes the switch 108 to move to the left so as to energize the left-hand motor 109 and thus rotate the shaft in the direction of the left-hand arrow. Such rotation of the shaft, which may be called in the closing direction, will rotate the blade 111 of the balancing potentiometer so as to increase the resistance in the lower half of the balancing potentiometer coil 106 and when the resistances in the W and B lines have become balanced, the core 107 will again be moved to its mid-position and the contact blade 108 will break its contact with the motor 109 and the motor will stop.

During the rotation of the shaft 110 in the closing direction through means which I will now describe, the loading on the lever 82 will be decreased and, as heretofore stated, decreasing the loading on the lever will cause the damper 62 to be moved toward closed position and the steam pressure thus reduced. The loading means illustrated comprises a loading chain 112 connected to the lever 82 and through a flexible connection to a generally spirally formed cam wind up member 113. Rotation of the shaft 110 in the so-called closing direction winds up the end of the loading chain 112, thus reducing the loading on the lever 82. Now, should the outside temperature drop, the reverse action of that described would take place, and the motor shaft 110 would be rotated in the direction of the right hand arrow, that is, in the so-called opening direction, so as to increase the loading on the lever 82 and thus open the damper so as to increase the steam pressure. While with the type of thermostat disclosed, equal temperature increments will move the blade 101 by substantially equal increments, it should be observed that because of the generally spiral or cam formation of the wind up device 113, the lever 82 will not be loaded by equal increments.

In addition to the temperature control, I may also provide a wind control. Generally speaking, temperature conditions being constant, an increase in wind velocity requires an increase in steam pressure. I have illustrated a conventional type of anemometer 115 with fly ball governor 116. The fly ball governor controls blades 117 in the W, B and R lines so that upon an increase in wind velocity (thus requiring a greater steam pressure), the resistance of the B line is reduced and the resistance of the W line is increased. As heretofore described, the effect of such resistance variations in the W and B lines will cause the shaft 110 to be rotated in the so-called opening direction so as to increase the loading on the lever 82 and thus cause an increase in steam pressure.

In addition to the controls noted, which may of course be used together or independently, I may employ a high limit room thermostat 118 which, when the high temperature limit is reached, will cause the W and R lines to be short circuited by closing of the contacts between those lines through the lines 119. Such short circuiting of the W and R lines will cause the motor to rotate the shaft 110 in the closing direction so as to unload the lever 82 and thus cause the damper to be moved toward closed position.

By means of the control panel 104, the loading of the damper regulator may be completely taken off of automatic control and put under manual control by means of the manual blade 120 and switch 120'. With the switch 120' in the position shown the automatic control is as heretofore described. With the switch 120' in its other circuit position, that is, when engaging the contact 120", the automatic control will be inoperative and the control is manual by means of the manual blade 120 and resistance 120''' engageable thereby. By moving the blade 120 over its resistance 120''' the difference in resistance between the W and B lines relatively to the R line will be varied and the loading motor will be actuated to load or unload the damper regulator in accordance with the position of the blade 120. Protective fixed resistances 104', 104'' are in the W and B lines and are effective when the switch 120' is on manual control. The variable resistances 104ª, 104ᵇ, 104ᶜ in the B, R and W lines also act as protective resistances and are principally for adjustment of resistances in the three lines. Various features in connection with the temperature and wind velocity devices have been disclosed and claimed in my co-pending application, Serial No. 47,778, filed November 1, 1935.

Instead of the purely automatic devices for controlling the loading of the damper regulator in accordance with, say, outside temperature, I may provide manual means for such control, together with automatic means, for indicating the desirability of load variation and the extent of such variation. In Fig. 6 I have shown diagrammatically such a manual device. As there shown, the thermostat 130 actuates a blade 131 in accordance with outside temperatures. The blade 131 contacts a resistance 132 similar to the resistance heretofore described. The W, B and R lines, connected to the resistances 132 and the blade 131, serve to control the coils 133 so that the contact member 134 will be moved either to the right or the left. For example, upon a rise in temperature, the blade 131 will be moved so as to reduce the resistance in the W line and the contact member 134 will be moved toward the right so as to close the contact through point 135 and thus energize the signal 136, which may be a buzzer, a red light, or other desirable device indicating a rise in the outside temperature. Conversely, a drop in the outside temperature will cause the contact 134 to close the circuit through contact point 137 so as to energize the signal 138 which may be a buzzer, green light, or other device, to indicate a falling temperature. Thus, immediately upon a change of temperature condition, which should be compensated for by variation in steam pressure, the operator is given a definite signal. In circuit with the resistance 132, I have a second resistance 139, which is contacted by a manually movable regulating blade 140. When the signal is given either by the device 136 or 138, the operator manually moves the blade 140 so as to energize the resistance in the W and B lines and thus the contact blade 134 will be moved to its open circuit position and the signal will cease. Such manual movement of the blade 140 is employed for controlling the loading on the damper regulator. In the form shown, the blade 140 is on a shaft 141 which carries a blade 142 contacting a resistance 143. The blade 142 is connected to an R line while the opposite ends of the resistance 143 are connected to W and B lines the same as heretofore described in connection with Fig. 2. These lines, connected to the blade 142 and resistance 143 may be substituted for the corresponding lines in a control system such as shown in Fig. 2; that is to say, the resistance 143 may take the place of the resistance 102 and the blade 142 may take the place of the blade 101 of Fig. 2 so that all of the variations defined in connection with Fig. 2 may be effected by the means disclosed in Fig. 6, except that instead of having the blade 142 move automatically in accordance with temperature changes, the latter is moved manually in accordance with the change indicated by the signal devices 136—138. When the blade 142 has been moved (concurrently with blade 140) to the desired extent, as stated the signal will be disconnected and the motor will have moved the damper regulating loading device to the desired extent and in the desired direction.

While the invention has been described in considerable detail and modifications illustrated, it is to be understood that various changes and modifications may be made within the scope of the invention as defined in the appended claims.

I claim:

1. In a damper regulator, a reciprocating fluid pressure motor including a cylinder and piston, a piston rod extending from said cylinder, a bracket connected with said cylinder, a diaphragm chamber carried by said bracket, a diaphragm therein, a pilot valve for controlling said reciprocating motor, a lever pivoted adjacent said diaphragm chamber, a tension spring directly connecting said piston rod and said lever at one side of the pivot point, loading means for said lever at the opposite side of the pivot point, a connection between said pilot valve and said lever and located between the pivot point and said spring, and a connection between said diaphragm and said lever and located at a point between said pilot valve connection and the pivot point, and a pressure connection to said diaphragm from a boiler.

2. In a damper regulator, a fluid pressure actuated motor for moving a damper, a pilot valve for controlling the supply of pressure fluid to said motor for moving the same in at least one direction, fluid pressure actuated means for urging said pilot valve in one direction, loading means for said pilot valve, said loading means including a chain cooperating with said pilot valve, a rotary motor, a generally spiral form of cam rotatable by said motor, and means for connecting said chain to said generally spiral form of cam, whereby upon equal increments of rotation of said rotary motor and cam the latter will pay out or wind up unequal increments of chain.

PAULSEN SPENCE.